(12) United States Patent  (10) Patent No.: US 8,501,334 B2
Yi  (45) Date of Patent: Aug. 6, 2013

(54) RECHARGEABLE BATTERY AND METHOD OF INJECTING ELECTROLYTE THEREINTO

(75) Inventor: Seung-Beob Yi, Youngin-si (KR)

(73) Assignee: Samsung SDI Co., Ltd., Yongin-Si (KR)

(*) Notice: Subject to any disclaimer, the term of this patent is extended or adjusted under 35 U.S.C. 154(b) by 182 days.

(21) Appl. No.: 13/009,530

(22) Filed: Jan. 19, 2011

(65) Prior Publication Data

US 2011/0300437 A1 Dec. 8, 2011

(30) Foreign Application Priority Data

Jun. 3, 2010 (KR) .................. 10-2010-0052427

(51) Int. Cl.
*H01M 2/36* (2006.01)
(52) U.S. Cl.
USPC .............................. 429/95; 429/72; 429/185
(58) Field of Classification Search
USPC .............. 429/72, 80, 95, 118, 176, 185
See application file for complete search history.

(56) References Cited

U.S. PATENT DOCUMENTS

| | | | |
|---|---|---|---|
| 6,207,318 | B1 | 3/2001 | Wessel et al. |
| 7,241,529 | B2 | 7/2007 | Cho |
| 2007/0202397 | A1 | 8/2007 | Cho |
| 2008/0070101 | A1 | 3/2008 | Barrella |
| 2008/0160393 | A1 | 7/2008 | Kim et al. |

FOREIGN PATENT DOCUMENTS

| | | |
|---|---|---|
| JP | 04-105458 | 9/1992 |
| JP | 11-283611 | 10/1999 |
| JP | 2000-251941 | 9/2000 |
| JP | 2003-007344 | 1/2003 |
| JP | 2003-031206 | 1/2003 |
| JP | 2004-103579 | 4/2004 |
| JP | 2005-071673 | 3/2005 |
| JP | 2005-310716 | 11/2005 |
| JP | 2007-234579 | 9/2007 |
| JP | 2010-155991 | 7/2010 |
| KR | 10 2007 0067779 | 6/2007 |
| KR | 10 2007 0096641 | 10/2007 |
| KR | 10 2007 0103890 | 10/2007 |
| WO | WO 2009/078604 A2 * | 6/2009 |

OTHER PUBLICATIONS

Office Action dated Aug. 11, 2011 in corresponding KR Application No. 10-2010-0052427.
Extended European Search Report dated Sep. 23, 2011 for corresponding EP Application No. 11168160.7.
Office Action dated Dec. 19, 2012 for corresponding JP Application No. 2010-200070.

* cited by examiner

*Primary Examiner* — Tracy Dove
(74) *Attorney, Agent, or Firm* — Knobbe, Martens, Olson & Bear, LLP (57) ABSTRACT

Provided is a pouch-type rechargeable battery. A rechargeable battery according to an exemplary embodiment of the present invention includes: an electrode assembly including a positive electrode, a negative electrode, and a separator interposed between the positive electrode and the negative electrode; a case receiving the electrode assembly; an electrolyte solution injection member positioned at one side of the case and forming an injection hole; and a sealing member covering and sealing the injection hole.

7 Claims, 5 Drawing Sheets

RECHARGEABLE BATTERY AND METHOD OF INJECTING ELECTROLYTE THEREINTO

CROSS-REFERENCE TO RELATED APPLICATIONS

This application claims priority to and the benefit of Korean Patent Application No. 10-2010-0052427 filed in the Korean Intellectual Property Office on Jun. 3, 2010, the entire contents of which are incorporated herein by reference.

BACKGROUND OF THE INVENTION

1. Field of the Invention

The present invention relates to a rechargeable battery, and more particularly, to a rechargeable battery with a pouch type external case.

2. Description of the Related Art

Rechargeable batteries can be charged and discharged unlike primary batteries which cannot be recharged. Low-capacity rechargeable batteries are used for portable compact electronic apparatuses such as mobile phones or notebook computers and camcorders and large-capacity rechargeable batteries are widely used as a power supply for driving a motor of a hybrid vehicle, a power storage battery, and the like.

The rechargeable batteries include an electrode assembly which includes a positive electrode, a negative electrode, and a separator, and a case having the electrode assembly positioned therein. The rechargeable batteries may be classified into a circular type, an angular type, and a pouch type depending on their shapes.

Among them, the pouch-type rechargeable battery has a structure in which the electrode assembly is incorporated in a pouch-shaped case and sealed. Therefore, due to the structure of the pouch-type rechargeable battery, it is difficult to refill or exchange an electrolyte solution after injecting the electrolyte solution at the time of manufacturing the battery. As a result, even when an injection error of the electrolyte solution occurs during using the pouch-type rechargeable battery, reworking is not practical and even when a life-span of the battery is shortened due to the depletion of the electrolyte solution, the generation of gas, and the like, regeneration is also not practical. In particular, such a structural limit may be a problem when the pouch-type rechargeable battery is used as the large-capacity battery.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a pouch-type rechargeable battery which is more reusable through refilling or exchange of the electrolyte solution.

An exemplary embodiment of the present invention provides a rechargeable battery that includes: an electrode assembly including a positive electrode, a negative electrode, and a separator interposed between the positive electrode and the negative electrode; and a case receiving the electrode assembly. Further, the rechargeable battery includes an electrolyte solution injection member positioned at one side of the case and forming an injection hole and a sealing member covering and sealing the injection hole.

The case may have a pouch shape.

The sealing member may include a sealing portion covering the top of the injection hole and an insertion portion inserted into the injection hole.

Threads that engage in each other may be formed on an outer surface of the insertion portion and the inner surface of the injection hole and the sealing member may further include an edge portion covering the electrolyte solution injection member. Further, the top of the sealing portion of the inserted sealing member may have the same height as one side of the case.

The electrolyte solution injection member may protrude at one side of the case and the electrolyte solution injection member may be concaved at one side of the case.

The sealing member may be formed by a partition and at this time, the sealing member may be attached to an external end of the electrolyte solution injection member through heat fusion.

The electrolyte solution injection member may be made of any one of polypropylene (PP) and polyethylene (PE) and the electrolyte solution injection member may be formed integrally with the case.

The rechargeable battery may further include: a positive tab connected to the positive electrode and protruding from the pouch; and a negative tab connected to the negative electrode and protruding from the pouch. In this case, the electrolyte solution injection member may be formed at one side and the other side of the case at which the positive tab and the negative tab, respectively.

Another exemplary embodiment of the present invention provides a method for injecting an electrolyte solution into a rechargeable battery that includes: preparing a rechargeable battery including an electrode assembly, a case receiving the electrode assembly, an electrolyte solution injection member positioned at one side of the case, and a sealing member sealing the electrolyte solution injection member; removing the sealing member of the rechargeable battery; connecting an electrolyte solution container with the electrolyte solution injection member of the rechargeable battery; injecting the electrolyte solution by using a difference in pressure between the rechargeable battery and the electrolyte solution container; and removing connection between the electrolyte solution container and the electrolyte solution injection member of the rechargeable battery.

The sealing member may include a sealing portion covering the top of the injection hole and an insertion portion inserted into the electrolyte solution injection member and the removing of the sealing member may be performed by pulling out the insertion portion of the sealing member inserted into the electrolyte solution injection member.

The sealing member may be formed by a partition covering the top of the electrolyte solution injection member and the removing of the sealing member may be performed by grinding or cutting the partition.

According to the exemplary embodiments of the present invention, it is possible to reuse a pouch-type rechargeable battery because an electrolyte solution can be refilled and exchanged and gas can be discharged through an electrolyte solution injection member.

Further, it is possible to save cost through reproduction even when the pouch-type rechargeable battery is used as the large-capacity battery.

DETAILED DESCRIPTION OF THE PREFERRED EMBODIMENT

The present invention will be described more fully hereinafter with reference to the accompanying drawings, in which exemplary embodiments of the invention are shown. In the specification and drawings, like reference numerals designate like elements. In addition, the size and thickness of each component shown in the drawings are arbitrarily shown for understanding and ease of description, but the present invention is not limited thereto.

Figure 1:
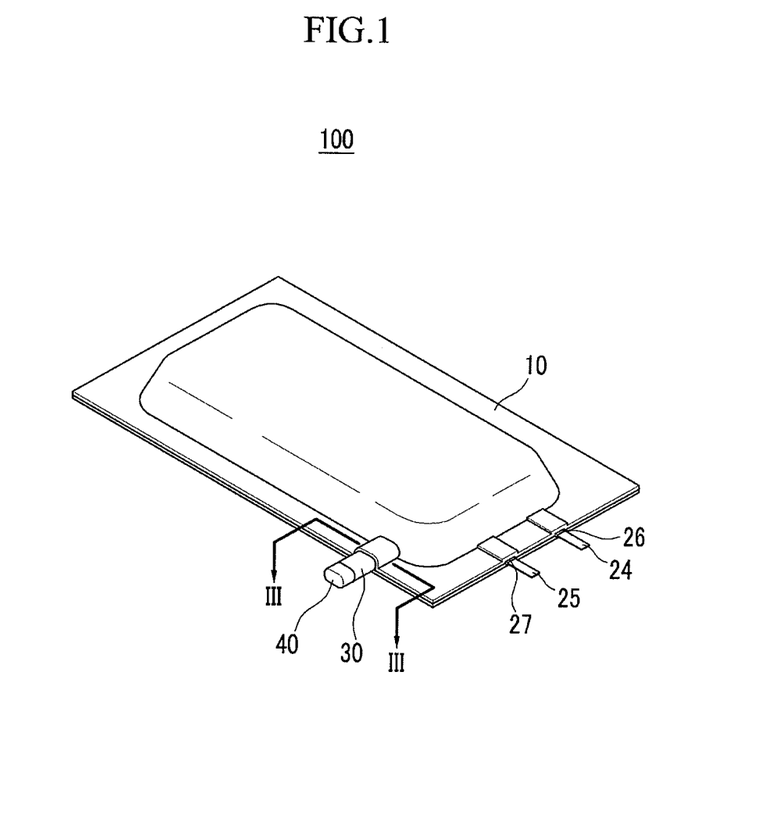
FIG. 1 is a perspective view of a pouch-type rechargeable battery according to a first exemplary embodiment of the present invention.
Figure 2:
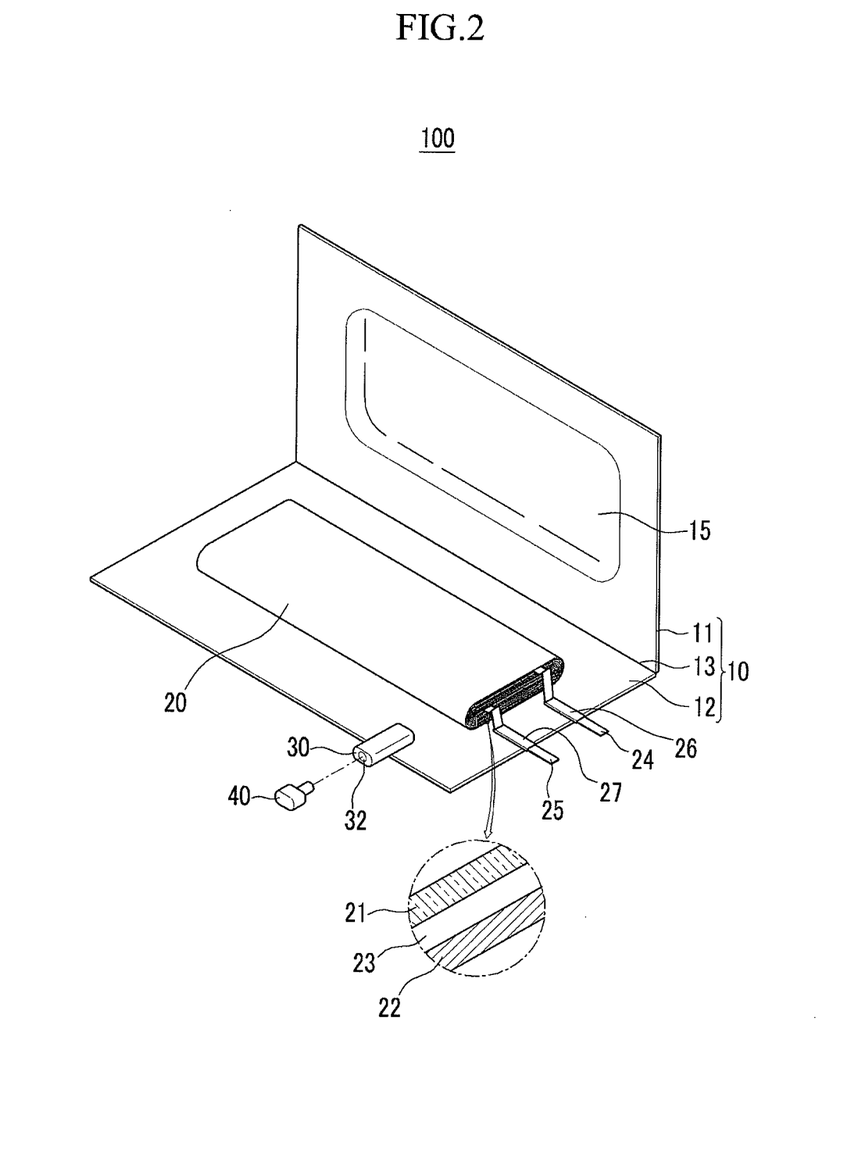
FIG. 2 is an exploded perspective view of a pouch-type rechargeable battery according to a first exemplary embodiment of the present invention.

FIGS. 1 and 2 are a perspective view and an exploded perspective view of a pouch-type rechargeable battery, respectively according to a first exemplary embodiment of the present invention.

Referring to FIGS. 1 and 2, the pouch-type rechargeable battery 100 according to the exemplary embodiment includes an electrode assembly 20 that is charged and recharged and a case 10 accommodating the electrode assembly 20.

The case 10 forms an overall exterior of the pouch-type rechargeable battery 100, has a pouch shape comprising one or more polymer layers, and provides a space accommodating the electrode assembly 20 therein. Specifically, the case 10 includes a front part 11, a rear part 12, and a folding part 13 foldably connecting the front part 11 and the rear part 12 with each other. A receiving part or area 15 which can accommodate the electrode assembly 20 is formed on the front part 11. However, the present invention is not limited to the structure of the case and includes the pouch-shaped case assembled in another way.

The electrode assembly 20 includes a positive electrode 21, a negative electrode 22, and a separator 23 interposed between the positive electrode 21 and the negative electrode 22. Specifically, the electrode assembly 20 is formed by a jelly-roll in which the positive electrode 21 and the negative electrode 22 having a strip shape are disposed with the separator 23 interposed therebetween and they are wound.

The positive electrode 21 includes a positive active material layer to which a positive active material is applied, and a positive uncoated portion to which the positive active material is not applied. The negative electrode 22 includes a negative active material layer to which a negative active material is applied and a negative uncoated portion to which the negative active material is not applied. A positive tab 24 and a negative tab 25 are formed at the positive uncoated portion and the negative uncoated portion, respectively. Each of the positive tab 24 and the negative tab 25 protrudes on the electrode assembly 20 in a direction vertical to a direction in which the electrode assembly 20 is spirally-wound. However, the present invention is not limited to the structure of the electrode assembly and includes electrode assemblies having other shapes, i.e., a stack-type electrode assembly, and the like.

Referring to FIG. 1, when the electrode assembly 20 is accommodated and sealed in the receiving part 15 of the case 10, the positive tab 24 and the negative tab 25 protrude on a side portion of the case 10. In this case, insulating layers 26 and 27 for insulating the case 10 and each of the electrode tabs 24 and 25 from each other may additionally be formed. The insulating layers 26 and 27 are formed to cover the electrode tabs 24 and 25, respectively and intercept a direct contact between the electrode tabs 24 and 25 and the case 10. The insulating layers 26 and 27 may help the contact portion as well as serve to prevent short-circuits. Further, in order to reinforce the adhesion between the polymer layer forming the inner surface of the case 10 and the electrode tabs 24 and 25 or the insulating layers 26 and 27, the surface of the polymer layer may contain a component having strong adhesiveness.

The pouch-type rechargeable battery 100 according to the exemplary embodiment includes an electrolyte solution injection member 30 on a side portion from which the electrode tabs 24 and 25 do not protrude. An injection hole 32 is formed at the center of the electrolyte solution injection member 30 so as to inject or discharge the electrolyte solution. The electrolyte injection member 30 is covered with a sealing member 40 to prevent the electrolyte solution from being leaked through the injection hole 32.

Figure 3:
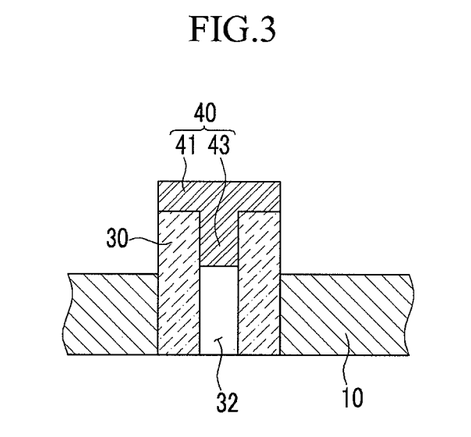
FIG. 3 is an enlarged cross-sectional view of an electrolyte solution injection member of a pouch-type rechargeable battery taken along line III-III of FIG. 1 according to a first exemplary embodiment of the present invention.

FIG. 3 is an enlarged cross-sectional view of an electrolyte solution injection member of a pouch-type rechargeable battery taken along line III-III of FIG. 1 according to a first exemplary embodiment of the present invention. Hereinafter, referring to FIG. 3, the electrolyte solution injection member 30 and the sealing member 40 according to the exemplary embodiment will be described in detail.

The electrolyte solution injection member 30 is formed separately from the case 10 and is sealed by the front part 11 and the rear part 12 of the case 10. The injection hole 32 which communicates an inner part and the outer part of the case 10 with each other is formed at the center of the electrolyte solution injection member 30 and the injection hole 32 is connected to the receiving part 15 of the case 10 accommodating the electrode assembly 20. A transverse section of the injection hole 32 taken vertically to a central axis of the injection hole 32 may have a circular shape, but the transverse section is not limited thereto and the injection hole 32 may have various cross-sectional shapes.

In the exemplary embodiment, the electrolyte solution injection member 30 is formed by a modified polymer. For example, the electrolyte solution injection member 30 may be made of polypropylene (PP) or polyethylene (PE). The electrolyte solution injection member 30 is formed separately from the case 10, but the electrolyte solution injection member 30 can be formed integrally with the case 10 by modifying the shape of the case 10 formed by the polymer layer.

In the exemplary embodiment, the sealing member 40 is formed in a cap structure including a sealing portion 41 and an insertion portion 43. The sealing portion 41 is formed to cover the top of the electrolyte solution injection member 30. The insertion portion 43 protrudes on one surface of the sealing portion 41 to be inserted into the injection hole 32 of the electrolyte solution injection member 30. The insertion portion 43 has the same cross-sectional shape as the injection hole 32 to prevent the electrolyte solution from being leaked through the electrolyte solution injection member 30. An outer diameter of the insertion portion 43 may be formed to coincide with an inner diameter of the injection hole 32. Further, the sealing member 40 may be made of the modified polymer such as polypropylene or polyethylene like the electrolyte solution injection member 30.

Figure 4:
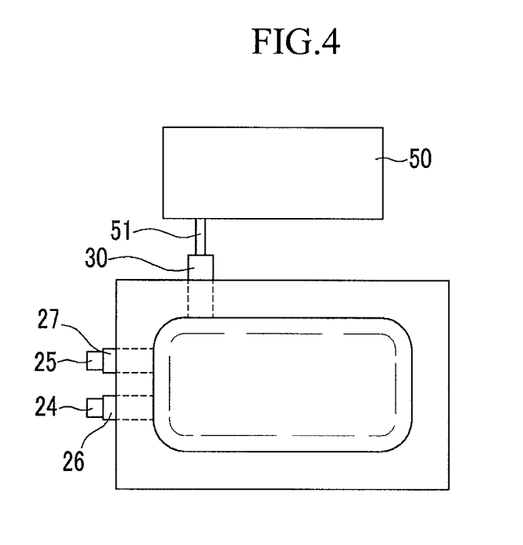
FIG. 4 is a diagram shown for describing a reproduction process of a pouch-type rechargeable battery according to a first exemplary embodiment of the present invention.

FIG. 4 is a diagram shown for describing a reproduction process of a pouch-type rechargeable battery according to a first exemplary embodiment. Referring to FIG. 4, a process of refilling or exchanging the electrolyte solution in the pouch-type rechargeable battery 100 will be described.

In order to refill the electrolyte solution, a connector 51 of an electrolyte solution container 50 is connected with the electrolyte solution injection member 30 of the pouch-type rechargeable battery 100 without the sealing member 40. In this case, the electrolyte solution in the electrolyte solution container 50 is stored at comparatively higher pressure of the electrolyte solution in the pouch-type rechargeable battery 100. Due to such a difference in pressure, the electrolyte solution moves from the electrolyte solution container 50 to the inside of the pouch-type rechargeable battery 100 through the injection hole 32 of the electrolyte solution injection member 30.

In the same manner as the electrolyte solution refilling process, even during removing the electrolyte solution from the rechargeable battery 100 in order to exchange the electrolyte solution, the connector 51 of the electrolyte solution container 50 is connected with the electrolyte solution injection member 30 of the pouch-type rechargeable battery 100. However, the electrolyte solution in the electrolyte solution container 50 is stored at comparatively lower pressure of the electrolyte solution in the pouch-type rechargeable battery 100. Alternately, the connector 51 of the electrolyte solution container 50 may be connected with the pouch-type rechargeable battery 100 while the electrolyte solution in the electrolyte solution container 50 is removed and a vacuum state is maintained in the electrolyte solution container 50. As a result, due to a difference of pressure, the electrolyte solution moves to the electrolyte solution container 50 from the pouch-type rechargeable battery 100 through the injection hole of the electrolyte solution injection member 30. The electrolyte solution removing process and the above-mentioned electrolyte solution refilling process are consecutively performed to exchange the electrolyte solution.

Meanwhile, a shape of a portion where the connector 51 of the electrolyte solution container 50 that is connected with the electrolyte solution injection member 30 may be formed similarly as a shape of the sealing member 40. That is, the connector 51 may include a sealing portion (not shown) and an insertion portion (not shown) at one end thereof. The sealing portion serves to cover the top of the electrolyte solution injection member 30 during the electrolyte solution injection process and the insertion portion is inserted into the injection hole to serve as a passage of the electrolyte solution. By such a structure, it is possible to prevent or inhibit the electrolyte solution from being leaked while refilling or removing the electrolyte solution.

Further, the sealing portion formed at one end of the connector 51 and the top of the electrolyte solution injection member 30 may be contacted with each other with a gasket (not shown) interposed therebetween. The gasket is used to seal a space between the sealing portion of the connector 51 and the electrolyte solution injection member 30. It is possible to securely prevent or inhibit the electrolyte solution from being leaked by adding the gasket while refilling or removing the electrolyte solution.

As such, in the exemplary embodiment, by additionally forming the electrolyte solution injection member 30 having the cap structure in the pouch-type rechargeable battery 100, it is possible to refill and exchange the electrolyte solution. Further, gas in the pouch-type rechargeable battery 100 may also be discharged in the similar manner as the electrolyte solution discharging process. As a result, it is possible to extend the life-span even in the case in which a large-capacity battery is used as the pouch-type rechargeable battery 100.

Hereinafter, a pouch-type rechargeable battery according to other exemplary embodiments of the present invention will be described with reference to FIGS. 5 to 8. In this case, in other exemplary embodiments, the same configuration as the first exemplary embodiment will briefly be described or not be described.

Figure 5:
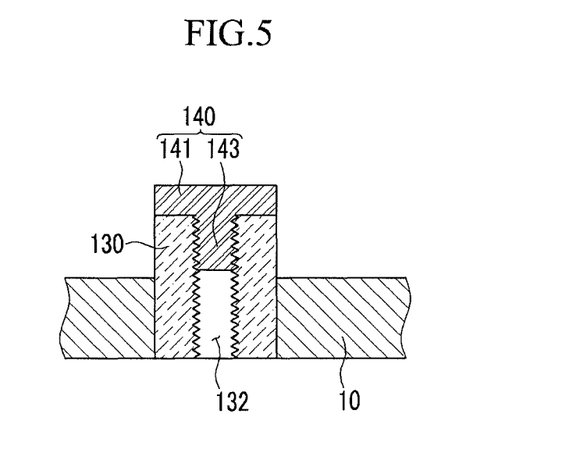
FIG. 5 is an enlarged cross-sectional view of an electrolyte solution injection member of a pouch-type rechargeable battery according to a second exemplary embodiment of the present invention.

FIG. 5 is an enlarged cross-sectional view of an electrolyte solution injection member of a pouch-type rechargeable battery according to a second exemplary embodiment of the present invention.

Referring to FIG. 5, the electrolyte solution injection member 130 according to the exemplary embodiment of the present invention includes an injection hole 132 at the center thereof and has a structure in which the injection hole 132 is connected to a receiving part of the case 10 where the electrode assembly is incorporated. In this case, the electrolyte solution injection member 130 is formed separately from the case 10, but the injection hole may be formed in the case 10 itself by modifying the shape of the case 10. Further, a cross-sectional shape of the injection hole 132 may be various shapes such as a circular shape, and the like.

In the exemplary embodiment, the sealing member 140 is formed in a cap structure including a sealing portion 141 and an insertion portion 143. The sealing portion 141 is formed to cover the top of the electrolyte solution injection member 130. The insertion portion 143 protrudes on one surface of the sealing portion 141 to be inserted into the injection hole 132 of the electrolyte solution injection member 130. The insertion portion 143 has the same cross-sectional shape as the injection hole 132 to prevent the electrolyte solution from being leaked through the electrolyte solution injection member 130. The outer diameter of the insertion portion 143 may be formed to coincide with the inner diameter of the injection hole 132.

Meanwhile, in the exemplary embodiment, a thread is formed such that an inner surface of the injection hole 132 of the electrolyte solution injection member 130 and an outer surface of the insertion portion 143 of the sealing member 140 that contact with each other engage in each other. As a result, the sealing member 140 may be inserted into the injection hole 132 of the electrolyte solution injection member 130 in accordance with a screw connection method, thereby further improving sealing property and easily refilling or exchanging the electrolyte solution.

Figure 6:
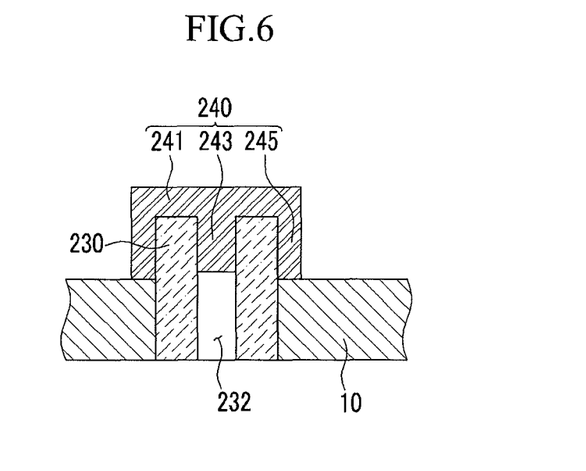
FIG. 6 is an enlarged cross-sectional view of an electrolyte solution injection member of a pouch-type rechargeable battery according to a third exemplary embodiment of the present invention.

FIG. 6 is an enlarged cross-sectional view of an electrolyte solution injection member of a pouch-type rechargeable battery according to a third exemplary embodiment of the present invention.

Referring to FIG. 6, an electrolyte solution injection member 230 according to the exemplary embodiment includes an injection hole 232 at the center thereof and has a structure in which the injection hole 232 is connected to a receiving part of the case 10 where the electrode assembly is incorporated.

In this case, the electrolyte solution injection member 230 is formed separately from the case 10, but the injection hole may be formed in the case 10 itself by modifying the shape of the case 10. Further, a cross-sectional shape of the injection hole 232 may be various shapes such as a circular shape, and the like.

In the exemplary embodiment, the sealing member 240 is formed in a cap structure including a sealing portion 241, an insertion portion 243, and an edge portion 245. The sealing portion 241 is formed to cover the top of the electrolyte solution injection member 230. The insertion portion 243 protrudes on one surface of the sealing portion 241 to be inserted into the injection hole 232 of the electrolyte solution injection member 230. Further, the edge portion 245 protrudes in the same direction as the insertion 243 at the edge of one surface of the sealing portion 241 and to surround the circumference of the electrolyte solution injection member 230 when the insertion portion 243 is inserted into the injection hole 232 of the electrolyte solution injection member 230. In this case, the insertion portion 243 has the same cross-sectional shape as the injection hole 232 to prevent the electrolyte solution from being leaked through the electrolyte solution injection member 230. An outer diameter of the insertion portion 243 may be formed to coincide with an inner diameter of the injection hole 232. Further, an inner diameter of the edge portion 245 may be formed to coincide with an outer diameter of the electrolyte solution injection member 230.

As such, the sealing member 240 includes the edge portion 245 so as to more securely prevent or inhibit the electrolyte solution from being leaked through the injection hole 232 of the electrolyte solution injection member 230.

Figure 7:
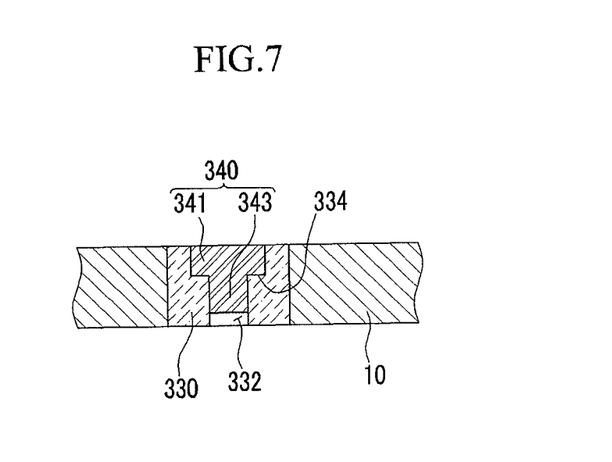
FIG. 7 is an enlarged cross-sectional view of an electrolyte solution injection member of a pouch-type rechargeable battery according to a fourth exemplary embodiment of the present invention.

FIG. 7 is an enlarged cross-sectional view of an electrolyte solution injection member of a pouch-type rechargeable battery according to a fourth exemplary embodiment of the present invention.

Referring to FIG. 7, the electrolyte solution injection member 330 according to the exemplary embodiment is formed to protrude less from the case 10. Specifically, one end of the electrolyte solution injection member 330 is disposed to substantially coincide with one surface of the case 10 and thereafter, is sealed by the front part and the rear part of the case 10.

Referring to FIG. 6, an electrolyte solution injection member 330 includes an injection hole 332 at the center thereof and has a structure in which the injection hole 332 is connected to a receiving part of the case 10 where the electrode assembly is incorporated. Further, the electrolyte solution injection member 330 further includes a support 334 with a step so that the sealing member 340 is inserted into the injection hole 332 and thereafter, supported.

In the exemplary embodiment, the electrolyte solution injection member 330 is formed separately from the case 10, but the injection hole may be formed in the case 10 itself by modifying the shape of the case 10. Meanwhile, a cross-sectional shape of the injection hole 332 may be various shapes such as a circular shape, and the like.

In the exemplary embodiment, the sealing member 340 is formed in a cap structure including a sealing portion 341 and an insertion portion 343. The sealing portion 341 is formed to cover the top of the support 334 of the electrolyte solution injection member 330. The insertion portion 343 protrudes on the center of one surface of the sealing portion 341 to be inserted into the injection hole 332 of the electrolyte solution injection member 330. In this case, the insertion portion 343 has the same cross-sectional shape as the injection hole 332 to prevent the electrolyte solution from being leaked through the electrolyte solution injection member 330. An outer diameter of the insertion portion 343 may be formed to coincide with an inner diameter of the injection hole 332. Further, the sealing portion 341 has the same cross-sectional shape as the top of the support 334. The sealing portion 341 may have a thickness as large as the sealing member 340 does not protrude from the case 10 when the insertion portion 343 is inserted into the injection hole 332.

By the configuration of the sealing member 340, it is possible to prevent the electrolyte solution from being leaked through the injection hole 332 of the electrolyte solution injection member 330. At the same time, since the electrolyte solution injection member 330 does not protrude from the case 10, the pouch-type rechargeable battery has a simple outer shape.

Figure 8:
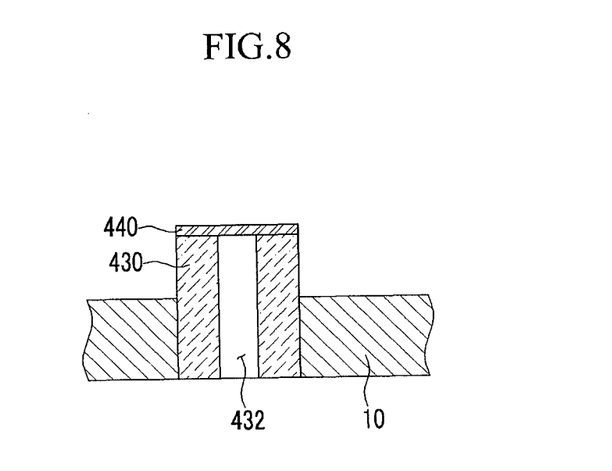
FIG. 8 is an enlarged cross-sectional view of an electrolyte solution injection member of a pouch-type rechargeable battery according to a fifth exemplary embodiment of the present invention.

FIG. 8 is an enlarged cross-sectional view of an electrolyte solution injection member of a pouch-type rechargeable battery according to a fifth exemplary embodiment of the present invention.

Referring to FIG. 8, an electrolyte solution injection member 430 according to the exemplary embodiment includes an injection hole 432 at the center thereof and has a structure in which the injection hole 432 is connected to a receiving part of the case 10 where the electrode assembly is incorporated. In the exemplary embodiment, the electrolyte solution injection member 430 is formed separately from the case 10, but the injection hole may be formed in the case 10 itself by modifying the shape of the case 10. Meanwhile, a cross-sectional shape of the injection hole 432 may be various shapes such as a circular shape, and the like.

In the exemplary embodiment, a sealing member 440 is formed by a partition, not a cap structure unlike the above-mentioned exemplary embodiments. That is, an additional insertion portion inserted into the injection hole 432 of the electrolyte solution injection member 430 is not provided and the partition covers the top of the electrolyte solution injection member 430. The sealing member 440 formed by the partition is undetachably bonded to the top of the electrolyte solution injection member 430 so as to prevent the electrolyte solution from being leaked through the injection hole 432 of the electrolyte solution injection member 430. The partition can be undetachably bonded to the top of the electrolyte solution injection member 430 by a method such as thermal fusion which is applying heat and pressure to a contact surface.

Since the sealing member 440 is formed by the partition to be undetachably bonded to the top of the electrolyte solution injection member 430, a method of grinding or cutting the partition or the top of the electrolyte solution injection member 430 by using a grinder is used when the electrolyte solution is refilled in the pouch-type rechargeable battery or the electrolyte solution is exchanged. After the partition or the top of the electrolyte solution injection member 430 is grinded or cut, the electrolyte solution is injected or discharged as shown in FIG. 4 and after the electrolyte solution has been refilled or exchanged, the partition is bonded to the top of the electrolyte solution injection member 430 by using the methods such as the thermal fusion, and the like.

The electrolyte solution should be repetitively refilled or exchanged and the electrolyte solution injection member 430 should have a sufficient length by considering a life-span, a reuse frequency, and the like of the pouch-type rechargeable battery. That is, a length of the electrolyte solution injection member 430 that protrudes from the case 10 should be larger than a value acquired by multiplying a shortened length and the reuse times during one-time electrolyte solution refilling or exchanging process by each other.

According to the shape of the sealing member 440 according to the exemplary embodiment, it is possible to prevent or inhibit the electrolyte solution from being leaked by preventing the sealing member from being removed by external pressure or impact.

While this invention has been described in connection with what is presently considered to be practical exemplary embodiments, it is to be understood that the invention is not limited to the disclosed embodiments.

That is, an electrolyte solution injection member and a sealing member may have various shapes except for the above-mentioned exemplary embodiments and forming positions thereof are also not limited to the above-mentioned exemplary embodiments and drawings. On the contrary, this invention is intended to cover various modifications and equivalent arrangements included within the spirit and scope of the appended claims.

What is claimed is:

1. A battery assembly comprising:
    an electrode assembly that generates electrical power and is rechargeable;
    a pouch casing formed of a polymer material, wherein the pouch casing defines a space that receives the electrode assembly and an electrolyte and is sealable so that the space is sealed;
    an electrolyte injection and extraction member that is positioned in the pouch casing so as to allow electrolyte to be injected into and extracted from the space and wherein the electrolyte injection and extraction member is resealable following injection or extraction of the electrolyte,
    wherein the electrolyte injection and extraction member defines a sealable aperture that communicates between the exterior of the pouch casing and the space and a first sealing member that seals the sealable aperture and is removable from the electrolyte injection and extraction member and wherein the electrolyte injection and extraction member and the first sealing member engage with each other so that the first sealing member is replaceable with a second sealing member.

2. The assembly of claim 1, wherein the electrode assembly comprises at least one tab that extends out of the pouch casing on a first side of the pouch casing and wherein the electrolyte injection and extraction member is positioned on a second side of the pouch casing.

3. The assembly of claim 1, wherein the first sealing member includes a head that is positioned adjacent an outer surface of the sealable aperture and a sealing portion that extends into the sealable aperture.

4. The assembly of claim 3, wherein the sealable aperture is threaded and the sealing portion is also threaded so that the first sealing member and the sealable aperture can be threadably sealed together.

5. The assembly of claim 3, wherein the electrolyte injection and extraction member extends outward from an outer surface the pouch casing and wherein the head sealing member surrounds the portion of the electrolyte injection and extraction member that extends outward from the outer surface of the pouch casing.

6. The assembly of claim 3, wherein the electrolyte injection and extraction member is mounted so that an exterior surface thereof is substantially flush with an exterior surface of the pouch casing.

7. The assembly of claim 1, wherein the electrolyte injection and extraction member includes an extending portion that defines the sealable aperture that extends outward from the pouch casing wherein the first sealing member is adhered to an outer end of the extending portion.

* * * * *